United States Patent
Atsugi et al.

[11] Patent Number: 6,146,244
[45] Date of Patent: Nov. 14, 2000

[54] SUBSTRATE PRODUCED BY USING ALUMINA PARTICLES AS AN ABRASIVE

[75] Inventors: Takeshi Atsugi; Manabu Shibata, both of Tochigi-ken, Japan; Tsutomu Koseki, deceased, late of Tochigi-ken, Japan, by Yoshitada Koseki, heirs, Tomiko Koseki, heirs

[73] Assignee: Kao Corporation, Tokyo, Japan

[21] Appl. No.: 09/189,398

[22] Filed: Nov. 10, 1998

[30] Foreign Application Priority Data

Nov. 10, 1995 [JP] Japan ..................... 7-292567
Mar. 27, 1996 [JP] Japan ..................... 8-71577

[51] Int. Cl.⁷ ........................................ B24B 1/00
[52] U.S. Cl. ........................ 451/36; 451/41; 428/64.2; 428/65.3
[58] Field of Search ................. 51/307, 308, 309; 106/1.05, 286.5; 427/355; 451/36, 38, 39, 40, 41; 428/64.2, 65.3

[56] References Cited

U.S. PATENT DOCUMENTS

| | | |
|---|---|---|
| 4,883,502 | 11/1989 | Miyazaki et al. . |
| 4,915,710 | 4/1990 | Miyazaki et al. . |
| 4,929,257 | 5/1990 | Miyazaki et al. . |
| 4,935,039 | 6/1990 | Miyazaki et al. . |
| 5,104,421 | 4/1992 | Takizawa et al. . |
| 5,149,338 | 9/1992 | Fulton . |
| 5,300,130 | 4/1994 | Rostoker . |
| 5,527,369 | 6/1996 | Garg . |
| 5,584,898 | 12/1996 | Fulton . |
| 5,609,657 | 3/1997 | Ishitobi . |
| 5,713,969 | 2/1998 | Shibata . |

FOREIGN PATENT DOCUMENTS

| | | |
|---|---|---|
| 2-04485 | 3/1990 | Japan . |
| 7-240025 | 9/1995 | Japan . |

*Primary Examiner*—Timothy V. Eley
*Attorney, Agent, or Firm*—Oblon, Spivak, McClelland, Maier & Neustadt, P.C.

[57] ABSTRACT

An abrasives composition comprises (i) one or more abrasives, (ii) one or more abrasion accelerators and (iii) water. The abrasive comprises intermediate alumina particles having a mean particle size of primary particles of 40 nm or less. The composition is used to produce a substrate by abrasion.

2 Claims, 1 Drawing Sheet

SUBSTRATE PRODUCED BY USING ALUMINA PARTICLES AS AN ABRASIVE

BACKGROUND OF THE INVENTION

1. Field of the Invention

The invention relates to an abrasives composition. This invention particularly relates to an abrasives composition capable of producing a substrate for a magnetic recording medium, which substrate has a very small value of surface roughness. This invention also relates to a process for producing a substrate, wherein the abrasives composition is used. This invention further relates to a glass-like carbon substrate for a magnetic recording medium, wherein the substrate has a very small value of surface roughness, and a magnetic recording medium using the glass-like carbon substrate.

2. Description of the Related Art

Recently, most computers are provided with recording devices, such as magnetic disk drives. With the increase in the amount of recorded information occurring in recent years, it is required that recording devices be capable of recording information at high densities. The magnetic disk drive has a magnetic head and a magnetic disk. As a means for achieving the recording of information at high densities, it is necessary to reduce the glide height of the magnetic head. For such purposes, it is necessary that the surface roughness (Ra) of the magnetic disk be as small as possible.

Recently glass-like carbon substrates have attracted particular attention as substrates for magnetic disks. The glass-like carbon substrates have a hardness higher than aluminum substrates, which are currently popular as the substrates for magnetic disks. Therefore, the thickness of the substrates can be reduced when made of glass-like carbon. Also, glass-like carbon has a small specific gravity and is light in weight, and therefore glass-like carbon substrates are light in weight. Accordingly, substrates are very suitable for use in computers, which should be kept small in size and light in weight.

However, when glass-like carbon substrates are used as substrates for magnetic disks, it is difficult for the surface roughness of the glass-like carbon substrates to be reduced, due to the high hardness of the glass-like carbon. Specifically, if α-alumina particles, typically used, are used in polishing step carried out during the production of the substrates for magnetic disks, the surface roughness of the substrates cannot be reduced (e.g., to less than 4 Å). This is because the α-alumina particles are hard and the mean part tie size of their primary particles is at least 0.1 $\mu$m. If very soft abrasive is used in lieu of α-alumina particles, sufficient abrasive effects cannot be obtained, and the surface roughness cannot be reduced.

Japanese Extent Application Laid-Open 7-240025 proposes a method for reducing the surface roughness of a magnetic disk substrate. The method comprises the step of corroding a substrate material with a chemical corrosive agent, which reacts with the substrate material and softens a portion of the substrate material, and the step of abrading and removing this portion of the substrate material using colloidal particles. Also proposed is a magnetic disk substrate having a surface roughness of less than 4 Å. However, it is difficult to reduce the surface roughness of a glass-like carbon substrate to less than 4 Å with the method proposed in this patent application.

SUMMARY OF THE INVENTION

An object of the present invention is to provide an abrasives composition capable of imparting a low surface roughness to a substrate, particularly a glass-like carbon substrate so that information can be recorded on the magnetic recording medium at high densities.

Another object of the present invention is to provide a substrate, in particular a substrate for a magnetic recording medium, having a very low surface roughness, and a process for producing the substrate.

The inventors carried out extensive research in order to achieve these objects and found that the surface of a substrate can be efficiently processed to the super-polished state by an abrasives composition containing specific alumina particles. The present invention is based on these findings.

The present invention provides an abrasives composition, comprising:

(i) one or more abrasives, (ii) one or more abrasion accelerators, and (iii) water, wherein the abrasives comprise intermediate alumina particles having a mean particle size of primary particles of 40 nm or less.

The present invention also provides a process for producing a substrate, comprising:

abrading surfaces of said substrate with an abrasives composition, wherein said abrasives composition comprises (i) one or more abrasives, (ii) one or more abrasion accelerators, and (iii) water, and said abrasives comprise an intermediate alumina particle having a mean particle size of primary particles of 40 nm or less.

The present invention provides an abrasives substrate, comprising glass-like carbon, wherein said substrate has a surface roughness Ha of less than 4 Å.

The present invention still further provides a magnetic recording medium, comprising:

(i) the above-mentioned glass-like carbon substrate, (ii) a magnetic layer on said substrate, and (iii) a protective layer on said magnetic layer.

With the abrasives composition in accordance with the present invention, wherein the abrasives comprise the intermediate alumina particles having a mean particle size of primary particles of 40 nm or less, a low surface roughness can be imparted to the substrate, so that information can be recorded on the magnetic recording medium at high densities.

In particular, with the abrasives composition in accordance with the present invention, high-hardness substrates, e.g. glass-like carbon substrates, for which the super-polishing process ordinarily cannot easily be carried out, can be processed such that the surface roughness of the abraded substrates may be less than 4 Å, providing very smooth surfaces.

DETAILED DESCRIPTION OF THE INVENTION

Figure 1:
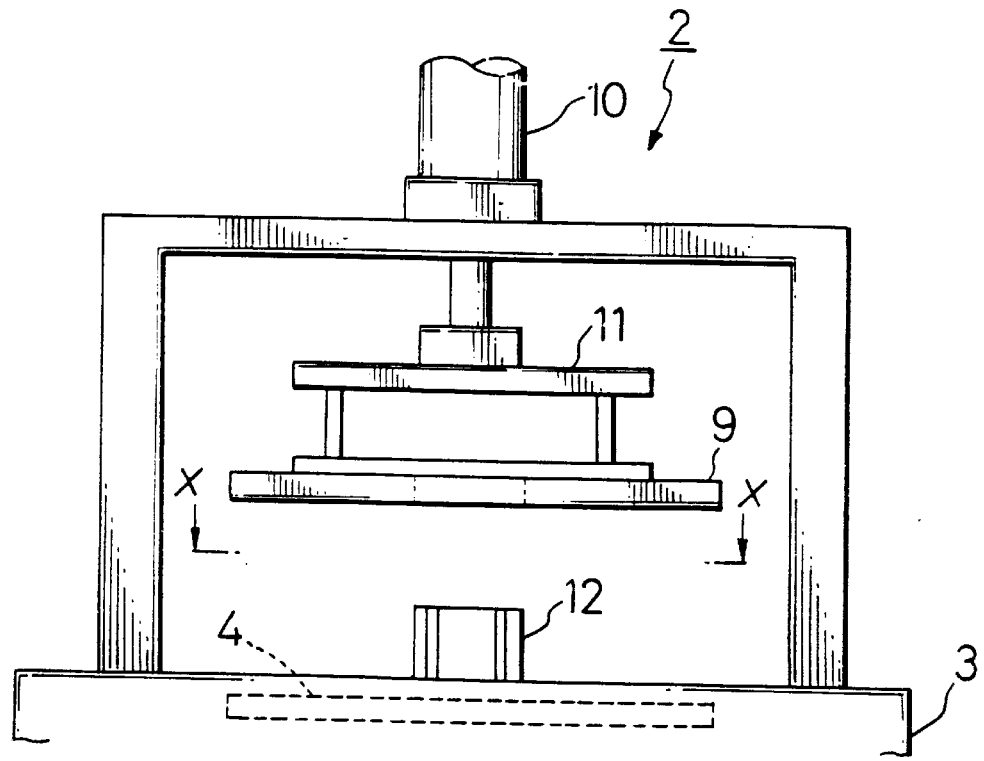
FIG. 1 is a schematic front view showing a double-sided polishing machine, which may be used in a polishing step for a substrate for a magnetic recording medium.

Firstly, the abrasives composition in accordance with the present invention will be described in detail.

As described above, the abrasives composition in accordance with the present invention contains, as essential components, water, an abrasive and an abrasion accelerator. Also, the abrasives composition in accordance with the present invention is characterized by using, as the abrasive, one or more intermediate alumina particles having a mean particle size of primary particles of 40 nm or less. The features of the abrasives composition in accordance with the present invention will be described hereinbelow.

The abrasive used is an intermediate alumina particle having a mean particle size of primary particles of 40 nm or less. The term "intermediate alumina particle" as used herein means alumina particles other than α-alumina particles. Specifically, examples of intermediate alumina particle include γ-alumina particles θ-alumina particles δ-alumina particles, ƒ-alumina particles, and amorphous alumina particles. If a substrate, particularly a high-hardness substrate (e.g., a glass-like carbon substrate) is abraded using α-alumina particles as the abrasive, it swill be difficult for the surface roughness of the abraded substrate to be reduced to a very small value (e.g., less than 4 Å). (Ordinarily, in such cases, the surface roughness of the abraded substrate is reduced to 10 Å at the lowest.) This is because the α-alumina particles are hard and their mean particle size is 0.1 μm or more. Alternatively, if the abrasive processing is carried out so that the surface roughness of the abraded substrate may become very small, the time required to carry out the abrasive processing will become very lone, and pits are liable to occur on the surface of the abraded substrate. In contrast, when the intermediate alumina particle is used as the abrasive, the surface roughness of the abraded substrate can be reduced (e.g. less than 4 Å) without any defects on the surface of the abraded substrate. The above-enumerated types of the intermediate alumina particle may be used alone, or two or more may be used in combination. Among the above-enumerated types of intermediate alumina particles, the γ-alumina particles and the θ-alumina particles are preferable, and the γ-alumina particles are particularly preferable.

The mean particle size of the primary particles of the Intermediate alumina particle is 40 nm or less. If the mean particle size of the primary particles of the intermediate alumina particle is larger than 40 nm, it will become difficult for the surface roughness of the abraded substrate to be reduced (e.g., less than 4 Å) when the abrasive processing is carried out on the substrate, particularly a substrate having high hardness, such as a glass-like carbon substrate. No particular limitation is imposed upon the lower limit of the particle size of the intermediate alumina particle. However, if the particle size of the intermediate alumina particle is very small, the abrasion speed will become slow, and the production efficiency will become low. Therefore, the mean particle size of the primary particles of the intermediate alumina particle is preferably at least 10 nm. The mean particle size of the primary particles of the intermediate alumina particle is more preferably 15 to 30 nm.

The intermediate alumina particle having a mean particle size of primary particles of 40 nm or less, e.g. the γ-alumina particles, can be produced by the known technique of heating ammonium alum [$NH_4Al(SO_4)_2$] up to 900° C. Also known to persons skilled in the art is that the intermediate alumina particle can also he easily produced with any one of various other techniques. The intermediate alumina particle is commercially available under the trade name "0.02CR" (primary particle size: 0.02 μm, supplied by BAIKOWSKI JAPAN CO.).

The mean particle size of the primary particles of the intermediate alumina particle may be measured by adding a dispersing agent to 0.1 g of the intermediate alumina particle, dispersing the intermediate alumina particle by subjecting to ultrasonic waves, drying the resulting dispersion, observing the dried intermediate alumina particle with a scanning electron microscope (SEM) and carrying out image analysis.

The intermediate alumina particle is used in the so-called "slurry state," in the abrasives composition in accordance with the present invention. The content of the intermediate alumina particle in the abrasives composition in accordance with the present invention may be selected in accordance with the viscosity of the abrasives composition, the quality required for the product, or the like. Generally, the content of the intermediate alumina particle in the abrasives composition in accordance with the present invention preferably is 0.05% to 30%, by weight, and more preferably 0.3% to 25%, by weight. When the content of the intermediate alumina particle in the abrasives composition in accordance with the present invention falls within the aforesaid range a substrate having a low surface roughness e.g., a surface roughness of less than 4 Å) can be obtained with good production efficiency.

No limitation is imposed upon the pH value of the abrasives composition in accordance with the present invention. However, the pH value of the abrasives composition is preferably 5 or lower, more preferably 2.0 to 4.5, and most preferably 2.5 to 4.0. When the pH value of the abrasives composition is 5 or lower, oxidation occurs on the surface of the substrate during the abrasive processing step, which aides the mechanical abrasion of the surface, and the surface roughness of the substrate can favorably be adjusted to be very low. By way of example, in order for the pH value of the abrasives composition to be 5 or lower, a metal salt having an oxidizing group, which will be described later, an inorganic acid such as sulfuric acid or nitric acid, an organic acid, or the like, may be added to the abrasives composition.

An abrasion accelerator is present in the abrasives composition in accordance with the present invention. By way of example, as the abrasion accelerator, a metal sail containing an oxidizing group may preferably be used. The metal salt containing an oxidizing group has the effect of promoting the oxidation of the surface of the substrate during the abrasive processing step and promoting the progress of the mechanical abrasion of the surface. The various abrasion accelerators may be used alone, or two or more may be used in combination. Generally, the metal salt containing an oxidizing group may be a metal halide, a metal salt of an organic acid, or a metal salt of an oxygen containing acid.

As the oxidizing group, any oxidizing group having oxidizing effects may be used. Examples of oxidizing groups include a nitrate group, a sulfate group, a sulfite group, a persulfate group, a chloride group, a perchlorate group, a phosphate group, a phosphite group, a hypophosphite group, a pyrophosphate group, a carbonate group, a lactate group, and an oxalate group. Among the above-enumerated oxidizing groups, the nitrate group and the sulfate group are particularly preferable.

Examples of metals constituting the metal salts containing the oxidizing groups include aluminum, magnesium, nickel and iron. Among the above-enumerated metals aluminum and magnesium are preferable.

The content of the abrasion accelerator in the abrasives composition in accordance with the present invention is preferably 0.05% to 30% by weight, and more preferably 0.3% to 20% by weight. When the content of the abrasion accelerator in the abrasives composition is within the aforesaid range, appropriate oxidizing effects can be obtained. Therefore, the substrate can be processed efficiently to a desired low surface roughness (e.g., of less than 4 Å), and the production efficiency can be increased.

The abrasives composition in accordance with the present invention can be prepared by, for example, adding the intermediate alumina particle, the abrasion accelerator, and the other components which will be described later, into water under stirring.

The content of water in the abrasives composition in accordance with the present invention is preferably 40% to 99.9% by weight, and more preferably 85% to 99.5% by weight. When the content of water in the abrasives composition falls within the aforesaid range, the substrate can be processed efficiently to a desired low surface roughness (e.g., of less than 4 Å), and the production efficiency can be increased.

If necessary, components other than those described above may also be added to the abrasives composition in accordance with the present invention. Examples of such other components include a dispersing agent for the abrasive, and a dispersing agent for fine powders which occur as a result of abrasion. The content of these components in the abrasives composition is preferably 0.5% to 10% by weight.

The substrate to be abraded with the abrasives composition in accordance with the present invention is preferably a substrate for a magnetic recording medium, for example, a carbon substrate, in particular a glass-like carbon substrate. However, the type of the substrate is not limited thereto. For example, the abrasives composition in accordance with the present invention is also applicable to the abrasive processing of other substrates, e.g. a glass substrate such as a reinforced glass substrate and a glass ceramic, and an aluminum substrate.

When the abrasives composition in accordance with the present invention is used for the polishing process carried out on the substrate for a magnetic recording medium, an abraded substrate having a low surface roughness, which is necessary to satisfy the recent demand for recording information on a magnetic recording nedium at high densities, can be obtained.

Figure 2:
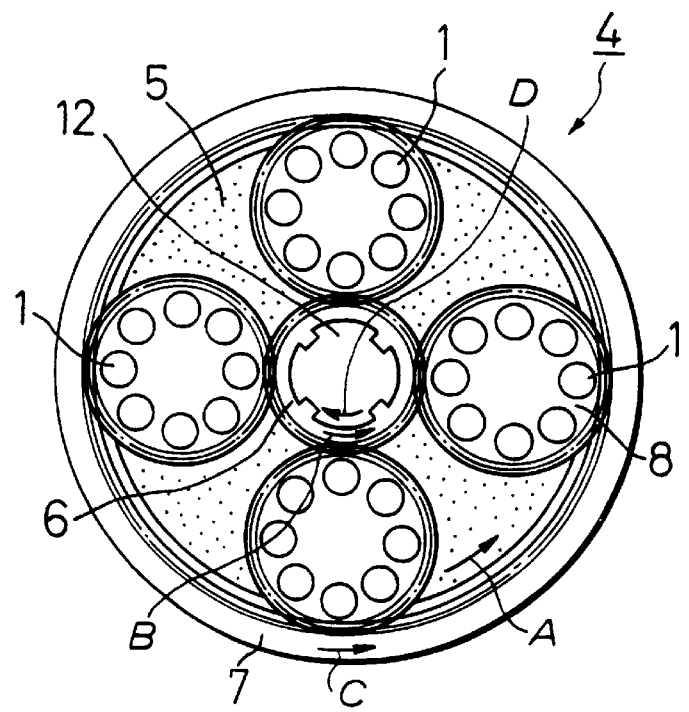
FIG. 2 is a view taken along line X—X of FIG. 1.

A preferred process for producing the substrate for a magnetic recording medium, in which the abrasive processing step is carried out with the abrasives composition in accordance with the present invention, will be described below with reference to FIGS. 1 and 2, by taking the super-polishing process of a glass-like carbon substrate as an example. FIG. 1 is a schematic front view showing a double-sided polishing machine, which may be used in a polishing step in the production of a substrate for a magnetic recording medium. FIG. 2 is a view taken along line X—X of FIG. 1.

With reference to FIGS. 1 and 2, a double-sided polishing machine 2 is provided with a base 3 and a lower lap 4, which is located on the base 3 and rotates in the direction indicated by the arrow A. A polishing pad 5 is fitted to the upper surface of the lower lap 4.

As illustrated in FIG. 2, a plurality of planetary gear-like carriers 8 are located on the upper side of the lower lap 4. Each carrier 8 is engaged with a sun gear 6, which is located at the center of the lower lap 4 and rotates in the direction indicated by the arrow B, and an internal gear 7, which is located on the outer circumference of the lower lap 4 and rotates in the direction indicated by the arrow C. Thus each carrier 8 rotates around the sun gear 6 and around its own axis. Each carrier 8 has a plurality of holes, and glass-like carbon substrates 1 serving as work pieces are respectively set in the holes.

Also, as illustrated in FIG. 1, an upper lap 9 is located above the lower lap 4 and the carriers 8. An polishing pad (not shown) is fitted to the lower surface of the upper lap 9. The upper lap 9 is rotatably mounted on a bracket 11, which is fitted to the end of the output rod of an air cylinder 10. The upper lap 9 can be moved up and down by the air cylinder 10. When the upper lap 9 is moved down, it is engaged with grooves of a rotor 12 on the base side. The rotor 12 rotates in the direction indicated by the arrow D in FIG. 2, and the associated upper lap 9 rotates in the same direction.

The abrasives composition in accordance with the present invention s supplied from a slurry feed pipe (not shown) to the position between the upper lap 9 and the lower lap 4.

When the upper lap 3 is moved down by the air cylinder 10, the glass-like carbon substrates 1, which move together with each carrier 8 are sandwiched between the lower lap 4 and the upper lap 9. In this manner, the abrasive processing is carried out.

In general, the super-polishing process of glass-like carbon substrates may be carried out with the aforesaid double-sided polishing machine under the conditions described below.

Specifically, the processing pressure is preferably 10 to 2,000 g/cm$^2$, and more preferably 30 to 1,500 g/cm$^2$.

The processing time is preferably 2 to 120 minutes, and more preferably 2 to 30 minutes.

The hardness [JIS A(JIS K-6301)] of the abrasion pads fitted to the platens of the double-sided polishing machine is preferably 40 to 100, and more preferably 60 to 100.

The rotation speed of the lower lap of the double-sided polishing machine may vary in accordance with the size of the polishing machine. For example, as for a 9B type double-sided polishing machine manufactured by SPEED FAM CO., the rotation speed of the lower lap is preferably is 10 to 100 rpm, and more preferably 10 to 60 rpm.

The supplying rate of the abrasives composition may vary in accordance with the size of the polishing machine. For example, as for the 9B type double-face polishing machine manufactured by SPEED FAM CO., the supplying rate of the abrasives composition is preferably 5 to 300 cc/min, and more preferably 10 to 150 cc/min.

When the super-polishing process is carried out on glass-like carbon substrates, i.e. the abrasive processing is carried out on the surfaces of a glass-like carbon substrate, under the conditions described above, a glass-like carbon substrates, which are ordinarily difficult to process to smooth surfaces, can be processed to a surface roughness of less than 4 Å.

The preferred process for producing the substrate for a magnetic recording medium, in which the abrasive processing step is carried out with the abrasives composition in accordance with the present invention, has been described above. However, the production process is not limited to the embodiment described above and may be applied to, for example, substrates other than the glass-like carbon substrates. In addition, the abrasives composition of the present invention is advantageous for the production of substrates other than a substrate for a magnetic recording medium, for example, a silicon wafer and various lenses which require a low surface roughness.

In the present invention, the magnetic recording medium can be obtained by using the glass-like carbon substrate which has been obtained in the manner described above and has a surface roughness of less than 4 Å, and forming at least a magnetic layer and a protective layer, in this order, on the substrate. The surface roughness of the magnetic recording medium reflects the surface roughness of the glass-like carbon substrate (i.e., less than 4 Å) and can be reduced to a very small value. Therefore, the magnetic recording medium obtained in accordance with the present invention is advantageous over the magnetic recording medium which is provided with a glass-like carbon substrate (having a surface roughness of approximately 10 Å) obtained by conventional abrasion techniques, in that the glide height of the magnetic head can be reduced to a very small value, and in that information can be recorded at high densities.

In the present convention, the surface roughness (center line mean roughness Ra) may be measured with an atomic force microscope.

In the magnetic recording medium of the present invention, the magnetic layer may be formed directly on the glass-like carbon substrate. However, it is preferred that at least one under layer is formed between the glass-like carbon substrate and the magnetic layer, as described in Examples 4 to 6. The preferable material of the under layer is a non-magnetic, highly crystalline metal. Examples of preferable materials for the under layer include Ti, Cr, W, Si, Al, and alloys of these metals.

Also, in the magnetic recording medium, if necessary, a layer having an uneven surface may be formed between the glass-like carbon substrate and the magnetic layer. The degree of unevenness of the layer is preferably as low as possible from the viewpoint of the reduction in the glide height of the magnetic head, provided that the magnetic head does not stick to the surface of the magnetic recording medium. For example, as for a magnetic disk drive in which the contact start and stop (CSS) system is employed, the layer having an uneven surface is preferably located only in the CSS region (i.e, head landing zone). As for a magnetic disk drive in which the magnetic head does not come into contact with the magnetic recording medium, it is preferable that the layer having an uneven surface is not formed. The layer having an uneven surface may be formed with a technique for carrying cut tape texturing only at a prescribed area on the surface of the glass-like carbon substrate which has been obtained from the abrasive processing step using the aforesaid abrasives composition, a technique for texturing with the spraying of fine particles, a technique for texturing with irradiation of a laser beam, or a technique for sputtering Al, Si, or an Al—M alloy, where M represents a metal having the capability to form a carbide.

As the material of the magnetic layer of the magnetic recording medium, Co-alloys containing Co as a principal constituent are preferable. The Co-alloys comprising Cr (CoCr alloys) are more preferable, and the Co-alloys comprising Cr and Pt (CoCrPt alloys) are particularly preferable. Specifically, CoCrPtB, CoCrPtTa, or the like, are preferable.

As the material of the protective layer of the magnetic recording medium, carbons, particularly amorphous carbon and diamond-like carbon are preferable.

In the magnetic recording medium, if necessary, a lubricant layer may be provided on the protective layer. As the Lubricant, for example, a perfluoroalkyl ether lubricant is preferable.

Having generally described this invention, a further understanding can be obtained by reference to certain specific examples which are provided herein for purposes of illustration only and are not intended to be limiting unless otherwise specified.

EXAMPLES 1, 2, 3 AND COMPARATIVE EXAMPLES 1, 2, 3

An abrasives composition, as a slurry, was prepared by mixing 1% by weight of the abrasive listed in Table 1, 1% by weight of aluminum nitrate, serving as an abrasion accelerator (in Comparative Example 2, aluminum nitrate was not added), and the balance of water, and stirring the resulting mixture. The abrasives composition obtained had a pH value listed in Table 1.

Thereafter, a glass-like carbon substrate, which had a diameter of 2.5 inches and the surface roughness of approximately 12 Å with a polishing process, was set In the double-sided polishing machine. The surface of the glass-like carbon substrate was thus subjected to a super-polishing process with the prepared abrasives composition. The abrasive processing with the double-sided polishing machine was carried out under the conditions shown below.

Setting conditions of Double-Sided Polishing Machine

Double-sided polishing machine used:
9B type double-sided polishing machine manufactured by SPEED AM CO.

Processing pressure: 150 g/cm$^2$

Processing time: 30 min

Hardness of polishing pad: 90

Rotation speed of lower lap: 40 rpm

Supplying rate of abrasives composition: 50 cc/min

The surface roughness Ra and the number of defects on the surface of glass-like carbon substrate, obtained from the super-polishing process, were measured with the methods described below. The results are shown in Table 1.

Surface Roughness Ra

The surface roughness Ra of 10×10 µm surface area was measured by using an atomic force microscope (AFM) image (NANOSCOPE III manufactured by DIGITAL INSTRUMENTAL CO.)

Number of Defects

The surface of the substrate was observed by using an optical microscope (×200), and the number of defects, having a size of 0.5 µm or larger on the entire surface of the substrate, was counted.

EXAMPLES 4, 5, 6 AND COMPARATIVE EXAMPLES 4, 5, 6

With a sputtering process, a Ti layer (first under layer), a Cr layer (second under layer), a $Co_{76}Cr_{12}Pt_8B_4$ layer (magnetic layer), and an amorphous carbon layer (protective layer) were successively formed to predetermined thicknesses on each of the glass-like carbon substrates obtained in Examples 1, 2, 3 and Comparative Examples 1, 2, 3. Further, a lubricant layer was formed to a predetermined thickness on the protective layer by the dip-coating of FOMBLIN Z-03 manufactured by AUGIMONT CO. In this manner, a magnetic disk was obtained. As for the obtained magnetic disk, a glide height test (GHT) was carried out under the conditions shown below. The results are shown in Table 2.

GHT

Magnetic Head: MG150T, 50% slider head manufactured by PROQUIP CO.

Passage rate: at a glide height of 1.0 µinch

Evaluation scale:
Passage rate of 95% to 100%; Very good
Passage rate of 70% to less than 95%; Good
Passage rate of less than 70%; Poor

TABLE 1

|  |  | Type of Alumina | Particle Size* of Alumina (nm) | pH of Abrasives Composition | Aluminum Nitrate (wt %) | Surface Roughness (Å) | Number of Defects (pieces) |
| --- | --- | --- | --- | --- | --- | --- | --- |
| Examples | 1 | γ-Al$_2$O$_3$ | 20 | 3.8 | 1 | 3.2 | 0 |
|  | 2 | γ-Al$_2$O$_3$ | 40 | 3.8 | 1 | 3.9 | 0 |
|  | 3 | θ-Al$_2$O$_3$ | 30 | 3.8 | 1 | 3.7 | 0 |
| Comparative | 1 | α-Al$_2$O$_3$ | 1000 | 3.8 | 1 | 12.1 | 0 |
| Examples | 2 | γ-Al$_2$O$_3$ | 40 | 7.2 | 0 | 15.0 | >500 |
|  | 3 | γ-Al$_2$O$_3$ | 45 | 3.8 | 1 | 5.3 | 120 |

*...Mean particle size of primary particles

TABLE 2

|  |  | GHT |
| --- | --- | --- |
| Examples | 4 | Very Good |
|  | 5 | Very Good |
|  | 6 | Very Good |
| Comparative | 4 | Poor |
| Examples | 5 | Poor |
|  | 6 | Good |

As is clear from the results shown in Table 1, when the super-polishing process was carried out on the glass-like carbon substrates using the abrasive compositions in accordance with the present invention (Examples 1, 2 and 3), no defect occurred on the surfaces of the abraded substrates, and the surface roughness of the abraded substrates could be reduced to a very small value (less than 4 Å). On the other hand, when α-alumina particles were used as the abrasive (Comparative Example 1), though no defect occurred, the low surface roughness obtainable with the abrasive compositions in accordance with the present invention could not be obtained. Also, when the abrasive processing was carried out with an abrasives composition containing no abrasion accelerator (Comparative Example 2), many defects occurred on the surface of the abraded substrate, and the low surface roughness obtainable with the abrasive compositions in accordance with the present invention could not be obtained. Further, in cases where the abrasive processing was carried out with the abrasives composition containing the abrasive having a mean particle size larger than 40 nm (Comparative Example 3) defects occurred on the surface of the abraded substrate, and the low surface roughness obtainable with the abrasive compositions in accordance with the present invention could not be obtained.

Also, as is clear from the results shown in Table 2, the magnetic disks (Examples 4, 5 and 6) which use the glass-like carbon substrates obtained in Examples 1, 2 and 3) subjected to the super-polishing process using the abrasive compositions in accordance with the present invention, had a low substrate surface roughness and exhibited good GHT results. On the other hand, the magnetic disks (Comparative Examples 4, 5 and 6) which use the substrates obtained in Comparative Examples 1, 2 and 3, exhibited GHT results inferior to those obtained with the magnetic disks of Examples 4, 5 and 6, because the magnetic disks in Comparative Examples 4, 5 and 6 do not use substrates having a surface roughness as low as obtained in Examples 1, 2 and 3.

Obviously, numerous modifications and variations of the present invention are possible in light of the above teaching. It is therefore to be under stood that within the scope of the appended claims, the invention may be practiced otherwise than as specifically described therein.

The priority documents of the present application, Japanese Patent Applications No. 7-292567 and No. 8-71577, filed on Nov. 10, 1995 and Mar. 27, 1996, respectively, are hereby incorporated by reference.

What is claimed as new and is desired to be secured by Letters Patent of the United States is:

1. A substrate produced by a process comprising:
    abrading a surface of said substrate with an abrasive composition, wherein said abrasive composition comprises
    (i) one or more abrasives,
    (ii) one or more abrasion accelerators, and
    (iii) water, and
said abrasives consist essentially of intermediate alumina particles having a mean particle size of primary particles of 40 nm or less and comprise an abrasive effective amount of at least one member selected from the group consisting of γ-alumina and θ-alumina.

2. A substrate produced by a process comprising:
    abrading a surface of a substrate comprising amorphous carbon with an abrasive composition, wherein said abrasive composition comprises
    (i) one or more abrasives,
    (ii) one or more abrasion accelerators, and
    (iii) water, and
said abrasives consist essentially of intermediate alumina particles having a mean particle size of primary particles of 40 nm or less and comprise an abrasive effective amount of at least one member selected from the group consisting of γ-alumina and θ-alumina.

* * * * *

UNITED STATES PATENT AND TRADEMARK OFFICE
CERTIFICATE OF CORRECTION

PATENT NO. : 6,146,244

DATED : November 14, 2000

INVENTOR(S): Takeshi ATSUGI, et al.

It is certified that an error appears in the above-identified patent and that said Letters Patent is hereby corrected as shown below:

On the Title page, Item [62], and Column 1, the U.S. Related Application Data, has been omitted. Item [62] and the top of Column 1 should read as follows:

--- Related U.S. Application Data

[62] Division of application No. 08/744,142, November 12, 1996, Pat. No. 5,868,604. ---

Signed and Sealed this

Twenty-ninth Day of May, 2001

Attest:

NICHOLAS P. GODICI

*Attesting Officer*  *Acting Director of the United States Patent and Trademark Office*